United States Patent

Chen

[11] Patent Number: 6,067,514
[45] Date of Patent: May 23, 2000

[54] METHOD FOR AUTOMATICALLY PUNCTUATING A SPEECH UTTERANCE IN A CONTINUOUS SPEECH RECOGNITION SYSTEM

[75] Inventor: Chengjun Julian Chen, White Plains, N.Y.

[73] Assignee: International Business Machines Corporation, Armonk, N.Y.

[21] Appl. No.: 09/102,920

[22] Filed: Jun. 23, 1998

[51] Int. Cl.[7] .................................................. G10L 15/26
[52] U.S. Cl. ............................................ 704/235; 704/257
[58] Field of Search .................................... 704/231, 251, 704/240, 246, 255, 256, 257, 270, 235, 200, 239, 277

[56] References Cited

U.S. PATENT DOCUMENTS

| | | | |
|---|---|---|---|
| 3,676,856 | 7/1972 | Manly | 707/531 |
| 4,914,704 | 4/1990 | Cole et al. | 704/235 |
| 5,027,406 | 6/1991 | Roberts et al. | 395/2.53 |
| 5,070,478 | 12/1991 | Abbott | 707/531 |
| 5,075,896 | 12/1991 | Wilcox et al. | 382/225 |
| 5,101,375 | 3/1992 | Goldhor | 707/531 |
| 5,293,452 | 3/1994 | Picone et al. | 704/250 |
| 5,305,420 | 4/1994 | Nakamura et al. | 704/271 |
| 5,682,501 | 10/1997 | Sharman | 704/260 |
| 5,933,525 | 8/1999 | Makhoul et al. | 382/186 |
| 5,949,961 | 9/1999 | Sharman | 704/270 |

FOREIGN PATENT DOCUMENTS 0649144   4/1995   European Pat. Off. ........ G11B 27/28

OTHER PUBLICATIONS

ICASSP–89. O'Shaughnessy, "Using Syntactic Information to Improve Large–Vocabulary Word Recognition". pp. 715–718. May 1989.

*Primary Examiner*—Richemond Dorvil
*Attorney, Agent, or Firm*—F. Chau & Associates LLP

[57] ABSTRACT

In a speech recognition system which recognizes a spoken utterance consisting of a sequence of spoken words and, in response, outputs a sequence of decoded words, a method for automatically punctuating the sequence of decoded words is provided. In a vocabulary of items including words, silences, and punctuation marks, assigning at least one baseform to each punctuation mark corresponding to one of silence and a non-word noise. Additionally, the method includes the step of automatically inserting a subject punctuation mark at a given point in the sequence of decoded words when an acoustic score and a language model score associated with the subject punctuation mark produce a higher combined likelihood than the acoustic score and the language model score associated with any other item in the vocabulary for the given point in the sequence of decoded words.

29 Claims, 2 Drawing Sheets

METHOD FOR AUTOMATICALLY PUNCTUATING A SPEECH UTTERANCE IN A CONTINUOUS SPEECH RECOGNITION SYSTEM

BACKGROUND OF THE INVENTION

1. Technical Field

The present invention relates to a speech processing systems and, more particularly, to a method for automatically punctuating a speech utterance in a continuous speech recognition system.

2. Discussion of Related Prior Art

In everyday speech, punctuation is not pronounced. However, in conventional speech recognition systems, in order to insert punctuation marks in the transcribed text, punctuation must be explicitly pronounced by name (e.g., PERIOD, COMMA, COLON, etc.). Accordingly, some users of conventional speech recognition systems find the requirement of pronouncing punctuation unnatural, and disruptive to the thinking process. However, the input of natural speech into a speech recognition system without pronounced punctuation results in an output without punctuation and also, an increased error rate. The latter occurs because punctuation is usually part of the language model. Thus, it would be highly desirable for punctuation to be automatically inserted.

Automatic insertion of punctuation would be important in many situations. One such situation is when spontaneous speech recognition is used to generate an original composition based on new ideas (known as free-hand composing). During free-hand composing, an uninterrupted thought process focused on the subject of the new ideas is desired. Accordingly, the requirement of simultaneously providing punctuation may be seen as an impediment to the flow of ideas since the correct use of punctuation requires a significant degree of thought (see, for example, "The Random House Guide to Grammar, Usage, and Punctuation", by Laurie Rozakis, Random House, 1991; "Chicago Manual of Style", 14th Edition, University of Chicago Press, 1993). Thus, punctuation is usually not expressed along with the original ideas during free-hand composing. Instead, and more naturally, the ideas are first dictated and then, punctuation is added. However, the automatic insertion of punctuation during free-hand composing would lessen the amount of editing required in the editing stage, and make the raw script more easily readable.

The automatic insertion of punctuation would also be important in situations such as decoding radio or television broadcasts, or public speeches. This is because, understandably, pronounced punctuation is not desirable or permissible in such situations.

In some countries (or for some languages), pronouncing the corresponding various types of punctuation marks is difficult (e.g., Chinese and Spanish), and often people do not have experience in pronouncing punctuation (compared to the United States, where dictation is widely used).

Thus, it would be desirable and highly advantageous to provide a method for automatically punctuating a speech utterance in a continuous speech recognition system.

SUMMARY OF THE INVENTION

According to one aspect of the invention, in a speech recognition system which recognizes a spoken utterance consisting of a sequence of spoken words and, in response, outputs a sequence of decoded words, a method for automatically punctuating the sequence of decoded words is provided. The method includes the step of, in a vocabulary of items including words, silences, and punctuation marks, assigning at least one baseform to each punctuation mark corresponding to one of silence and a non-word noise. Additionally, the method includes the step of automatically inserting a subject punctuation mark at a given point in the sequence of decoded words when an acoustic score and a language model score associated with the subject punctuation mark produce a higher combined likelihood than the acoustic score and the language model score associated with any other item in the vocabulary for the given point in the sequence of decoded words.

In one embodiment of the invention, the baseform corresponding to silence is represented by one or more silence phones. Further, the baseform corresponding to the non-word noise is represented by one of: one or more consonant phones preceded and followed by a silence phone; one or more vowel phones preceded and followed by a silence phone; and one or more consonant phones and one or more vowel phones preceded and followed by a silence phone. In another embodiment of the invention, in the training phase of an n-gram language model associated with the language model scores, a corresponding text corpus is segmented into paragraphs to obtain conditional probabilities corresponding to each punctuation mark preceding at least one word. The segmenting of the text corpus into paragraphs allows the obtained conditional probabilities to be used during the decoding process.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

The invention is directed to a method for automatically inserting punctuation in the output of a continuous speech recognition system using the phonetic characteristics of punctuation, together with properly processed context information. The method is based on the following observations. First, in a natural speech, the breaking or separating point of a sentence or a phrase is often signified by a relatively long pause or a non-speech noise such as, for example, a breath. However, in consideration of the sophisticated rules of punctuation established in modern times, a pause in a speech may not necessarily be related to a punctuation mark. Accordingly, acoustic phenomena alone is not sufficient for predicting punctuation marks. This leads to the second observation, which is that the location of punctuation marks is often related to the context of the corresponding utterance. Thus, by considering the context of a long pause, the existence and type of punctuation that is associated with the pause can be predicted with a high degree of accuracy.

Figure 1:
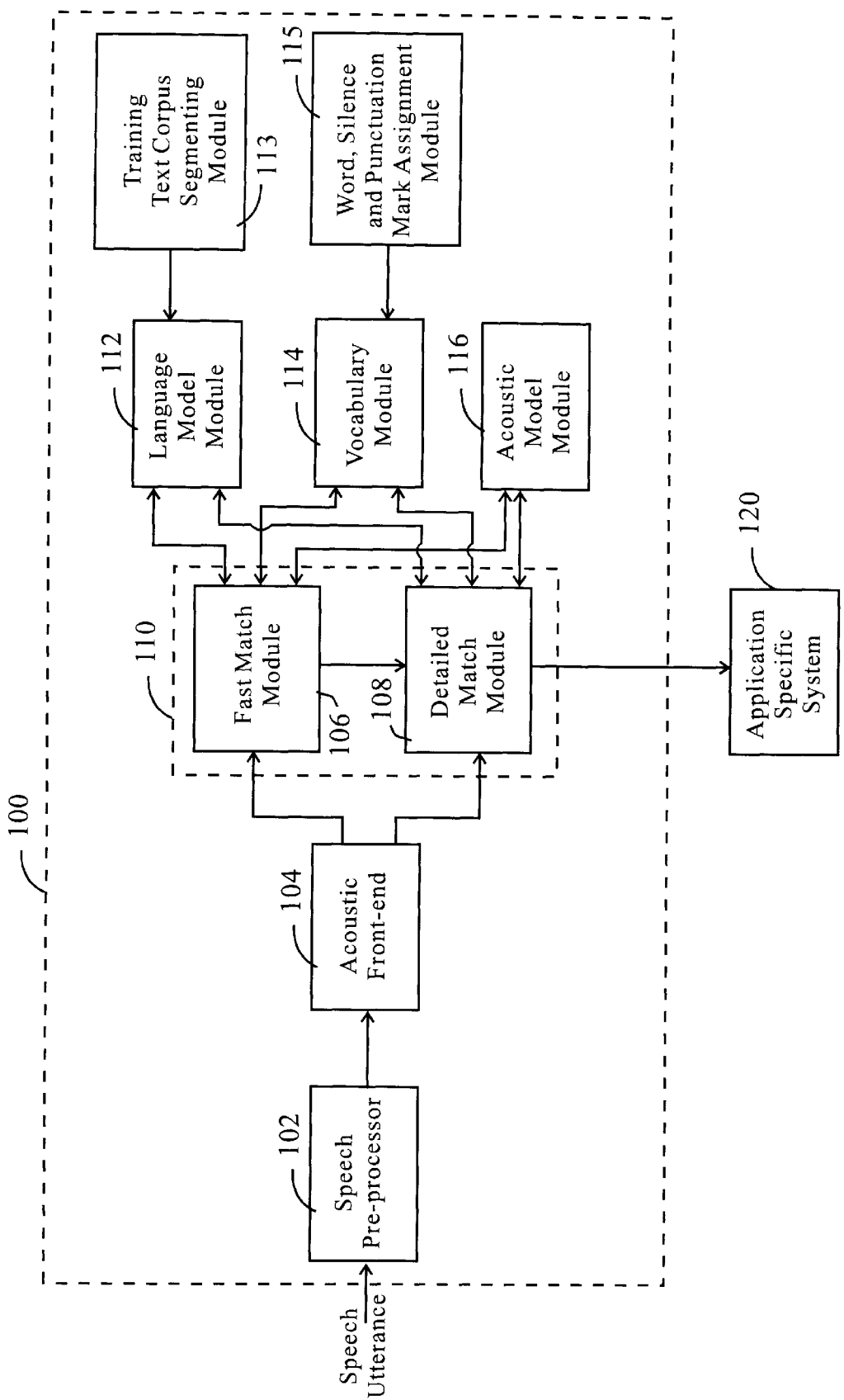
FIG. 1 is a block diagram of a speech recognition system according to the present invention in conjunction with an application-specific system.

Referring initially to FIG. 1, a block diagram is shown of a speech recognition system 100 according to the present invention operatively coupled to an application-specific system 120. The speech recognition system 100 includes a speech utterance pre-processor 102 operatively coupled to an acoustic front-end 104. The front-end 104 is also operatively coupled to a fast match module 106 and a detailed match module 108. The fast match module 106 and detailed match module 108, which are operatively coupled to each other, are collectively referred to as a decoder 110. A language model module 112 (hereinafter "language model"), a vocabulary module 114 (hereinafter "vocabulary"), and an acoustic model module 116 (hereinafter "acoustic model") are each operatively coupled to both the fast match module and the detailed match module. Additionally, a training text corpus segmenting module 113 is operatively coupled to the language model 112, and a word, silence and punctuation mark assignment module 115 is operatively coupled to the vocabulary 114.

It is to be appreciated that the present invention is usable with any speech recognition system and is not, in any way, limited to use with or dependent on any details or methodologies of any particular speech recognition arrangement. For instance, even generalized speech recognition systems such as the commercially available large vocabulary IBM ViaVoice or ViaVoice Gold systems may be adapted to permit and/or perform automatic punctuating functions in accordance with the invention. In any case, it should be understood that the elements illustrated in FIG. 1 may be implemented in various forms of hardware, software, or combinations thereof. As such, the main recognition elements (e.g., fast match module 106, detailed match module 108, language model 112, segmenting module 113, vocabulary 114, assignment module 115, and acoustic model 116) are implemented in software on one or more appropriately programmed general purpose digital computers. Each general purpose digital computer may contain, for example, a central processing unit (CPU) operatively coupled to associated system memory, such as RAM, ROM and a mass storage device, via a computer interface bus. Accordingly, the software modules performing the functions described herein may be stored in ROM or mass storage and then loaded into RAM and executed by the CPU. As a result, FIG. 1 may be considered to include a suitable and preferred processor architecture for practicing the invention which may be achieved by programming the one or more general purpose processors. Of course, special purpose processors may be employed to implement the invention. Given the teachings of the invention provided herein, one of ordinary skill in the related art will be able to contemplate these and similar implementations of the elements of the invention.

A brief explanation of the functionality of the components of the speech recognition system 100 will now be given. The speech utterance pre-processor 102 receives the speech uttered by a speaker (spoken word sequence) and generates waveforms. The speech utterance pre-processor 102 may include an audio-to-analog transducer (microphone) and an analog-to-digital converter which respectively transduce the utterances into an electrical signal and then convert the electrical signal into a digital signal representative of the uttered speech. Further, the pre-processor may preferably sample the speech signal and partition the signal into overlapping frames so that each frame is discretely processed by the remainder of the system. The output signal of the pre-processor 102 is the sampled speech waveforms which are provided to an acoustic front-end 104. Alternatively, the acoustic front-end 104 may incorporate the functions of the pre-processor 102. The acoustic front-end 104, as is known in the art, generates feature vectors from the input utterance and labels from the feature vectors. The labels may be considered, in a general sense, to identify a corresponding phone. As is known, a phone is a basic unit of speech. It is to be appreciated that the pre-processor 102 and acoustic front-end 104 may be collectively referred to as an acoustic processor.

The speech recognition process is typically constrained by the acoustic model 116 which corresponds to the phones (basic units of speech) employed in the system 100, the vocabulary 114 which defines the vocabulary of the system in terms of these phones, and the language model 112 which specifies allowable sequences of vocabulary items. The functions of the text corpus segmenting module 113 and the word, silence and punctuation mark assignment module 115 corresponding to the language model 112 and the vocabulary 114, respectively, will be discussed below.

The fast match module 106, which is based on the use of HMMs, is designed to examine all the words in the vocabulary and to reduce the number of candidate words (acoustically similar words) for a given string of incoming labels. That is, a list of candidate words is produced from the words in the vocabulary so that the number of words that require further processing is reduced. After the number of candidate words have been reduced by the fast match module, the contextual likelihoods associated with the language model are used to further reduce the number of candidate words. Then, the remaining candidate words are processed by detailed match module 108 in order to compute the likelihood of a segment of acoustics given a word model. The output of the decoder 110 is based on the results obtained by the detailed match module.

The decoded word(s) output from the decoder 110 are provided to the application-specific system 120. It is to be understood that the application-specific system 120 may be any system that employs the decoded speech signals as input. For example, the application-specific system 120 may be a telephone modem system whereby the spoken utterances received by the speech recognition system 100 represent text to be electronically forwarded to a remote location. The text could correspond to a speech by a newsworthy individual and the remote location could be a news service such as a newspaper. Of course, the above application is merely an example and, as such, the present invention is not intended to be limited thereby.

A more detailed explanation of the functionality of some of the components of the speech recognition system 100 will now be given. As is known, the acoustic model 116, which is built (trained) by analyzing speech samples of hundreds of speakers, consists of a collection of acoustic prototypes. Each prototype corresponds to a gaussian distribution of a set of feature vectors associated with a phone. When a segment of a speech is input to the speech recognition system 100, the acoustic front-end 104 examines the uttered speech in successive intervals and, based on which prototype (of the acoustic model) is closest by some measure to the feature values of the input speech, the label for the closest prototype is assigned to the interval. That is, based on the feature values generated during a centisecond interval, one prototype from a fixed set of prototypes is selected as the closest.

The vocabulary 114 is a table of words corresponding to an application of interest (e.g., general, medical, legal). Each word in the vocabulary is represented as a sequence of phones which are combined to form the pronunciation of the word. This sequence of phones is generally referred to as the baseform of a word. Examples of baseforms for given words may be:

| WORDS | PHONETIC DESCRIPTION |
| --- | --- |
| A | AX |
| ADAPTER | AX D AE PD T AXR |
| ADAPTERS | AX D AE PD T AXR Z |
| AGENT | EY JH AX N TD |
| AGENTS | EY JH AX N TS |
| ANALYSIS | AX N AE L AX S AX S |
| ANALYSIS | AX N AE L IX S IX S |

Many words may have more than one baseform depending on how they are pronounced. For example, the word "ANALYSIS" may be pronounced with the vowels "Y" and "I" being a short "A" sound (AX) or a short "I" sound (IX). The baseforms are assigned by any number of conventional ways, such as, for example, by hand (the most prevalent method) and by consulting a software dictionary. In the latter case, manual correction of the baseforms is usually required. The vocabulary also contains baseforms corresponding to silence and punctuation marks. It is to be appreciated that, in a conventional vocabulary, the baseforms of punctuation marks correspond to the pronunciations of the words which represent the marks, as shown below for the punctuation mark comma:

| PUNCTUATION MARK | PHONETIC DESCRIPTION |
| --- | --- |
| COMMA | K AA M AX |

Generally, in speech recognition systems the vocabulary is a user selectable item and may be changed as required by the user. For example, a user may desire to utilize the system with a medical vocabulary and then, may later desire to utilize the system with a legal vocabulary. In each vocabulary, words will be drawn from the respective application of interest. On the other hand, the acoustic and language models are not user selectable items but rather basic, built-in components of the speech recognition system.

The language model 112, which is built (trained) by analyzing a large text corpus (e.g., up to hundreds of millions of words), consists of a collection of conditional probabilities corresponding to the combining of words in the vocabulary. The task of the language model is to express the restrictions imposed on the way in which words can be combined to form sentences. Some of the most popular language models are n-gram models which make the assumption that the a priori probability of a word sequence can be decomposed into conditional probabilities of each word given the n words preceding it. In the context of n-gram language models, a trigram is a string of three consecutive words (denoted by $w_1$ $w_2$ $w_3$). Similarly, a bigram is a string of two consecutive words, and a unigram is a single word. The conditional probability of the trigram model may be expressed as follows: $\text{Prob}(w_3|w_2w_1)$.

As is known, before the decoder 110 performs the process of decoding using the feature vector signals provided by the acoustic front-end 104, the acoustic model 116 and the language model 112 need to be trained. The parameters (probabilities) of both these models are generally estimated from training data from the application of interest. In order to train the acoustic model, acoustic training data is provided by a proposed user of the system, as well as a transcription representative of the training data. The acoustic training data is uttered by the training speaker and processed through the speech pre-processor 102 and acoustic front-end 104, as explained above. The transcription may be input directly to the decoder 110 as text. Further, in order to train the language model, a transcription representative of typical sentences in the selected application domain is also provided to the decoder.

Generally, a trigram language model is trained using a transcription consisting of a large text corpus. The corpus consists of sentences, which nominally correspond to individual utterances that a speaker might produce in the context of a particular task. The training involves inputting the sentences and determining statistics for each word model in a manner which enhances the probability of the correct word relative to the probabilities associated with other words. As is known, such training provides counts for all trigrams, bigrams and unigrams identified in the corpus.

The count of a given n-gram is the number of occurrences of the given n-gram in the corpus (word frequency). In conventional n-gram language models, the text corpus is segmented into sentences before word frequencies are counted. The segmenting of the text corpus is performed by text corpus segmenting module 113.

After segmentation, the first word of each sentence is deemed an "unconditional" word, which means that its probability of occurrence does not depend on any preceding words. Thus, in a conventional trigram language model, the first word of a sentence is considered a unigram. Words other than the first word of a sentence are deemed "conditional" words, which means that their probability of occurrence does depend on the words that precede them. Therefore, in a conventional trigram language model, the second word of a sentence may form a unigram or bigram, and any word after the second word of a sentence may form a unigram, bigram or trigram. As such, the training of the language model results in determining the likelihood of each ordered triplet of words, ordered pair of words, or single words in the vocabulary. From these likelihoods, a list of the most likely triplets of words and a list of the most likely pairs of words are formed. Additionally, the likelihood of a triplet not being in the triplet list and the likelihood of a pair not being in the pair list are determined.

The goal of the decoder 110 is to find the word sequence that has the maximum a posteriori probability given an observed acoustic input. Conventional approaches to this goal can be divided into two major groups, the synchronous search and the asynchronous search. The synchronous search is usually a form of the well known Viterbi algorithm. In the synchronous search, at each instance, all necessary computations are performed, so that the same time region of an utterance is never evaluated more than once. In the asynchronous search, for a given time region of the utterance, the search is performed by computation of the total acoustic score for each word in the vocabulary, one word at a time. Each of the two approaches has advantages and disadvantages.

By way of example, the invention will be described with reference to a popular asynchronous search scheme currently utilized in speech recognition systems, the envelope search, which is a tree-based search. Thus, a general description of the envelope search scheme will now be provided. Modifications to the conventional search scheme to obtain automatic punctuating according to the present invention will be later described.

In sum, the envelope search utilizes a heuristic evaluation function which is related to the likelihood of a word sequence to order all hypothesized word sequences on a priority queue. In each iteration, the best hypothesized word sequence based on this heuristic evaluation function is selected and it is extended, generating more word sequence hypothesis. In order to compute the best complete path (word sequence) from the vocabulary, the envelope search scheme utilizes the fast match module to pre-select a small set of candidate words from the vocabulary which are acoustically similar to a word to be decoded and thus, have a high probability of including the correct word. Additionally, the detailed match module is used to compute the probability Prob(Y|w) for some segment of acoustics Y and a word w. Further, a trigram language model is used to evaluate the prior probability of a word sequence. Thus, in sum, candidate words are selected by the fast match, and the decoder outputs the final results on the basis of the language context and the likelihood calculated by the detailed match. For an in-depth discussion on the envelope search scheme, see "Modern Methods of Speech Processing", edited by Richard J. Mammone and Ravi P. Ramachandran, Kluwer Academic Publishers, (1995), and "A Tree-Search Strategy for Large-Vocabulary Continuous Speech Recognition", by Bahl et al., appearing in ICASSP, vol. 1, pp. 572–75 (1995).

The decoder 110 utilizes the fast and detailed match modules and the language model to search for the most likely sentence. As stated above, the search is based on a tree structure, where the set of all possible word sequences are organized into a word-level tree. The root node corresponds to the null word sequence and each branch in the tree corresponds to a word. Thus, each path starting at the root node corresponds to a sequence of words. Paths ending at terminal nodes of the tree correspond to complete sentences and paths ending at non-terminal nodes correspond to partial sentences. Given a sequence of acoustic observations, the search algorithm explores the tree and attempts to find the complete path having the highest score. The decoder maintains a dynamically changing list of partial paths (sequences of words) that have been explored thus far. During the search process the decoder also keeps track of the best path found thus far. Partial paths are designated as alive or dead and that status is re-evaluated in each iteration of the search. Further, in each iteration of the search, one of the alive partial paths is chosen for extension, and a candidate list of words is constructed for this path. Each word in the candidate list results in a new partial path which is one word longer than the chosen path. Each new partial path is compared to the best complete path and replaces the best complete path if it exhibits a higher likelihood. The search is terminated when there are no more partial paths that are alive. The best complete path is then output as the recognized sentence.

Thus, the state of the decoder 110 at a given time is characterized by a set of ordered paths, where each path is a partial sentence representing a particular amount of input speech. Let $w_1 w_2 \ldots w_i$ equal the sequence of words corresponding to a path $p_j$. The paths are ordered based on their likelihood which is obtained as $$l(p_j) = \text{Prob}(Y_1^k | w_1 \ldots w_i) * \text{Prob}(w_1 \ldots w_i) \quad (1)$$

where the first term is obtained from the acoustic match, $$Y_l^k$$

being the acoustic evidence covered by this partial sentence, and the second term is obtained from the language model.

The probability assigned by the language model to a subject word will now be described. When a subject word follows two words, a determination is made as to whether the subject word and the two preceding words are on the most likely triplet list described above with reference to the training of the language model. If so, the stored probability assigned to the triplet is indicated. If the subject word and its two predecessors are not on the triplet list, a determination is made as to whether the subject word and its adjacent predecessor are on the most likely pairs of words list described above. If so, the probability of the pair is multiplied by the probability of a triplet not being on the triplet list, and the product is assigned to the subject word. If the subject word and its predecessor(s) are not on the triplet list or pair list, the probability of the subject word alone is multiplied by the likelihood of a triplet not being on the most likely triplet list and by the probability of a pair not being on the most likely pair list. The product is assigned to the subject word.

Thus, the language model is used to enhance the probability of a correct word selection during the decoding process. This is because while most of the candidate words selected by the fast match module will be acoustically similar to the correct word, some of the candidate words may be removed from further consideration based on linguistics. For example, in the context of the following two words by the ($w_1$ $w_2$), the acoustic fast match list for the correct word way ($w_3$) might include linguistically unlikely words such as say, ray, and may. Thus, for the partial path chosen for extension at each iteration of the search, the preceding words (e.g., by the) define the language model context.

It is to be appreciated that the technique of the envelope search is well known in the art and, as such, is not elaborated further herein. For further detail, see, for example, "Modern Methods of Speech Processing", edited by Richard J. Mammone and Ravi P. Ramachandran, Kluwer Academic Publishers, (1995), and "A Tree-Search Strategy for Large-Vocabulary Continuous Speech Recognition", by Bahl et al, appearing in ICASSP, vol. 1, pp. 572–75 (1995).

It is to be appreciated that while conventional speech recognition systems are continuously improving, such systems can only provide an output text which includes punctuation if the punctuation is pronounced as part of the spoken word sequence input to the system. Accordingly, if punctuation is not pronounced as part of the spoken input to the system, then the output text will not contain punctuation. This is because conventional speech recognition systems treat punctuation marks the same as words. The acoustic model contains prototypes corresponding to the pronunciation of punctuation marks. The vocabulary contains baseforms corresponding to pronounced punctuation (e.g., K AA M AX corresponding to the word comma), and the language model counts punctuation marks in the same manner in which words are counted. As a result, text with punctuation can only be output from the system when the punctuation is pronounced. Advantageously, the present invention overcomes this deficiency by providing automatic insertion of punctuation in a speech recognition system without requiring such punctuation to be pronounced during the input utterance to the system.

Figure 2:
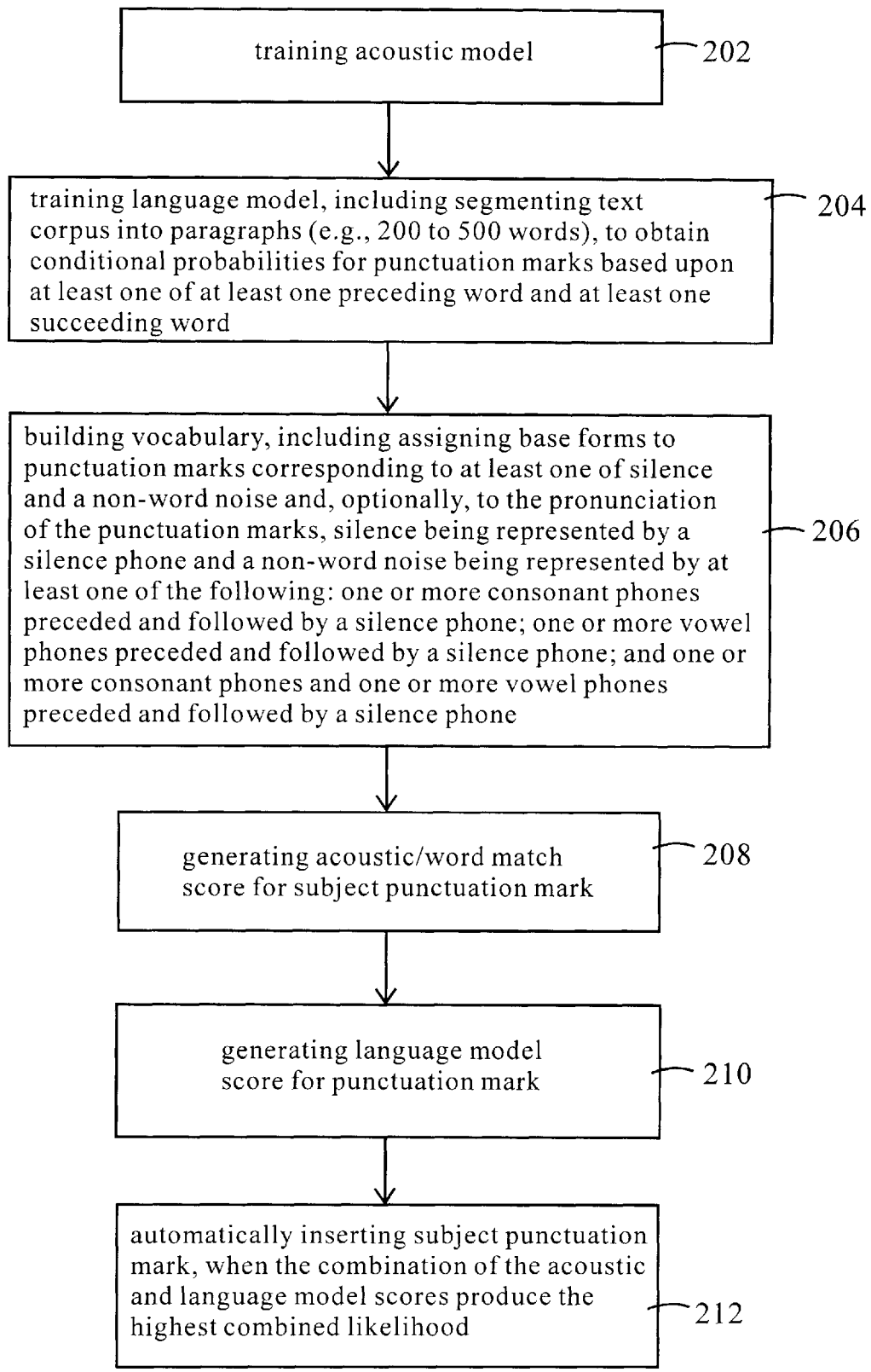
FIG. 2 is a flow chart illustrating a method for automatically punctuating a sequence of decoded words output from a continuous speech recognition system according to the present invention.

Referring to FIG. 2, in a speech recognition system which recognizes a spoken utterance consisting of an input sequence of spoken words and outputs a sequence of decoded words, a method for automatically punctuating the sequence of decoded words includes the step of training an acoustic model (step 202).

The method also includes the step of training an n-gram language model (step 204). However, in contrast to the conventional way of training an n-gram language model, where the corresponding training text corpus is first segmented into sentences before counting word frequencies, the method according to the invention segments the text corpus into paragraphs. As explained in further detail hereinbelow, this allows conditional probabilities to be generated corresponding to punctuation marks occupying a location in a bigram and trigram other than only the last word position.

Additionally, the method according to the invention includes building a vocabulary of items (step 206), the items including words, silences, and punctuation marks. Each item in the vocabulary is represented by at least one baseform. However, in contrast to the conventional way of building the vocabulary, where a punctuation mark is assigned a baseform(s) corresponding to the pronunciation of the word representing the punctuation mark, the method according to the invention assigns a punctuation mark in the vocabulary a baseform corresponding to silence (e.g., a long pause) and/or a non-word noise (e.g., a lip smack, etc.). The baseform corresponding to silence is represented by at least one silence phone (e.g., a silence phone, two consecutive silence phones, etc.). The baseform corresponding to a non-word noise is represented by at least one of the following: one or more consonant phones preceded and followed by a silence phone; one or more vowel phones preceded and followed by a silence phone; and one or more consonant phones and one or more vowel phones preceded and followed by a silence phone.

In the decoding phase, a word match score is generated corresponding to the probability that a subject punctuation mark in the vocabulary corresponds to acoustic data generated by the spoken utterance (step 208). It is to be appreciated that the spoken utterance (and hence the acoustic data generated therefrom) does not contain pronounced punctuation. Moreover, a language model score is generated corresponding to the probability that the subject punctuation mark corresponds to acoustic data generated by said utterance (step 210). The subject punctuation mark is automatically inserted when the combination of the word match score and the language model score produces the highest combined likelihood as compared to the combined likelihood of any other item in the vocabulary (step 212).

ASSIGNING ACOUSTIC PROPERTIES TO PUNCTUATION MARKS

According to the invention, in order to provide automatic punctuating in a speech recognition system, phonetic (acoustic) properties are assigned to punctuation marks in the acoustic vocabulary. These phonetic properties are technically referred to as baseforms. Referring back to FIG. 1, assignment module 115 performs the assigning of baseforms. However, it is to be appreciated that the baseforms may be assigned in any number of ways, as described hereinbelow. For example, the baseforms may be assigned by hand.

In an illustrative embodiment of the invention, the baseforms of separating punctuation marks (e.g., comma, colon, semicolon, period, question mark, and exclamation mark) are defined as silence, double silence, or a non-word noise (e.g., inhalation noise, lip smack, click, "um") sandwiched between two silences. The silence and double silence may be considered to refer to silence intervals, as described below.

According to the illustrative embodiment, a single silence is designated by the symbol "X". Punctuation marks represented by a single silence and thus, the symbol "X", are shown in the following phonetics table:

| | |
|---|---|
| , | X |
| : | X |
| ; | X |
| . | X |
| ? | X |
| ! | X |

Usually, a phone such as "X" is represented by three states in a HMM (Hidden Markov Model). Each state typically corresponds to at least one frame of speech or a multiple thereof, with a frame generally covering a time interval of 10 milliseconds. Thus, a single silence represents a pause of at least 30 milliseconds (0.03 second).

A double silence is designated by the symbol "X X". Thus, a double silence represents a pause of at least 60 milliseconds (0.06 second). Punctuation marks represented by a double silence are shown in the following phonetics table:

| | |
|---|---|
| , | X X |
| : | X X |
| ; | X X |
| . | X X |
| ? | X X |
| ! | X X |

A non-word noise (i.e., a noise made by a speaker during a pause, such as breathing, lip smacking, "um", etc.) is designated by one or more consonant or vowel phones (or a combination thereof) sandwiched between two single silences. A consonant is used for breathing and other non-word noises (e.g., lip smacking, etc.). A non-word noise represents a pause of at least 90 milliseconds (0.09 second). Punctuation marks represented by a non-word noise are shown in the following phonetics table:

| | |
|---|---|
| , | X HH X |
| , | X F X |
| , | X K X |
| , | X P X |
| , | X UM X |

It is to be appreciated that the assignment of baseforms to punctuation marks may be performed via any of the above-described combinations. That is, it is possible to assign the same phonetic baseform to all separating punctuation marks, or to assign different baseforms to different punctuation marks. For example, for terminal punctuation marks such as periods, question marks, and exclamation marks, only long pauses (e.g., 0.09 seconds or more) are assigned. However, this requires the user to make longer pauses at those terminal punctuation marks. Thus, the baseforms should be assigned according to practical considerations.

RECASTING THE LANGUAGE MODEL TO ASSIST PREDICTING PUNCTUATION EXISTENCE AND TYPE

In accordance with the invention, the conventional language model is recast in order to better predict the existence and type of punctuation. However, it is to be appreciated that by simply assigning baseforms to punctuation marks in the vocabulary, punctuation marks may be automatically predicted. That is, at the occurrence of a long pause, breathing noise, etc., the context of that long pause, breathing noise, etc., will be examined to determine if a punctuation mark is required. In such a case, the existence and the type of punctuation mark is, in part, determined by context (language model score).

In assigning baseforms to punctuation marks and using a conventionally trained language model, in the case of non-terminal punctuation marks (e.g., comma, semi-colon, colon, etc.), the left and the right context is examined in determining if punctuation is required at the occurrence of a long pause, breathing noise, etc. However, in the case of a terminal punctuation, only the left context is used. As a result, terminal punctuation marks are not predicted as accurately as non-terminal punctuation marks. In fact, terminal punctuation marks may be often misrepresented by commas instead of periods (or question and exclamation marks). Advantageously, the present invention recasts the conventional language model in order to aid the decoder in more accurately predicting the existence of terminal punctuation marks.

The conventional language model is recast to overcome the deficiency in the building (training) of the language model. Specifically, this deficiency pertains to the counting process employed in training the language model, which separates the text corpus into sentences before counting the word frequencies. In the training of the conventional language model, particularly with respect to the counting process, each full stop (i.e., terminal punctuation mark such as a period, exclamation mark and question mark) is followed by a special symbol (or "word"), for example, "BOUNDARY_WORD". The symbol BOUNDARY_WORD is put into the text corpus after a terminal punctuation to signify the end of a record or unit. In the conventional method of training the language model, a record or unit corresponds to a single sentence. After a BOUNDARY_WORD, the counting process starts again. Therefore, according to the conventional method, each terminal punctuation is unrelated to the words in the next sentence. Thus, if the input speech to the recognition system is spoken continuously across the sentence boundary without explicitly signifying the end of the sentence (i.e., pronouncing a terminal punctuation), then the prediction of a terminal punctuation would have a very low probability. As a result, a non-terminal punctuation mark such as, for example, a comma will be predicted instead of a terminal punctuation mark.

Accordingly, the present invention provides a method for recasting the language model in order to better predict terminal punctuation marks. The method according to the invention concatenates several sentences (each having a terminal punctuation) into one block terminated by a single BOUNDARY_WORD. The length of the records (i.e., paragraphs according to the method of the invention) should not be too long, such that the counting process can be done within a reasonable period of time. A record of 200 to 500 words has been proven to be of an appropriate size. By segmenting the text corpus into paragraphs, a terminal punctuation mark may occupy a word position in a bigram and trigram other than only the last word position (as was the result of the conventional method). Therefore, the prediction of a terminal punctuation mark can be based on both the left and the right context, resulting in a more accurate prediction. Referring back to FIG. 1, segmenting module 113 performs the segmenting of the training test corpus.

In a preferred embodiment of the present invention, a user can choose to utilize either of the two vocabulary structures. The first vocabulary structure contains baseforms corresponding to pronounced punctuation (e.g., K AA M AX corresponding to the word comma). Thus, when using the first vocabulary structure, punctuation marks will only be output from the decoder when the punctuation marks are explicitly pronounced. In the second vocabulary structure, the pronunciation of a punctuation mark is identified as a long pause, a breathing noise, etc. Thus, a punctuation mark may be predicted at the occurrence of a long pause, breathing noise, etc., if the context also requires a punctuation mark. The two vocabulary structures allow the user to switch between pronouncing punctuation or having punctuation automatically inserted.

Alternatively, the user could use a hybrid vocabulary structure, where the baseform of a punctuation mark corresponds to, for example, a long pause (X X), and also to the pronunciation of the word representing the punctuation mark (e.g., K AA M AX corresponding to the word comma). In such a case, the user may obtain automatic punctuation based on the pauses (etc.) present in a spoken utterance input to the speech recognition system and, when desired, may also obtain punctuation based on the explicit pronunciation of a punctuation mark. This enables punctuation marks which are generally not able to be predicted (e.g., quotation marks, brackets) to be inserted with a very high degree of accuracy. Thus, the hybrid vocabulary structure enables a user to rely primarily on automatic punctuating according to the invention, but still allows the user to accurately insert hard to predict punctuation, when desired, by pronouncing such punctuation.

The following example illustrates the importance of segmenting the text corpus into paragraphs to accurately predict terminal punctuation marks. Presume that the following two training sentences are input to a speech recognition system during the training phase: "On rainy days you should carry an umbrella. Otherwise, you may get wet". A pause (or breathing noise, etc.) will likely be present in between both sentences. This pause will be represented by a silence phone and the words of the two sentences will be represented by non-silence phones. Also presume that the following two test sentences are input to the system during the testing phase, with the punctuation marks not pronounced: "You should lock your car doors when you park at the mall. Otherwise, your car may be robbed". The prediction of a terminal punctuation mark between the two sentences by the decoder depends on the acoustic score and the language model score. According to the conventional method, since no punctuation (e.g., period) was explicitly uttered during the testing phase, the probability of punctuation being predicted equals zero. On the other hand, if a baseform is assigned to a pause (or breathing noise, etc.) according to the invention, a punctuation mark will be predicted between the two test sentences. However, the punctuation mark may be a comma. Nonetheless, if the (training) text corpus was segmented into paragraphs according to the invention, then the word "otherwise" would occupy a word position in a bigram and trigram following a period (as opposed to only occupying the first word position). Thus, the prediction of a terminal punctuation in between the two test sentences would be very likely since both the left and the right context associated with the word "otherwise" would be considered and there is a high probability that a period precedes the word "otherwise".

PUNCTUATION PROBABILITIES FOR VARIOUS LANGUAGES

It is to be appreciated that for some languages, certain (a priori) probabilities may be utilized to predict the existence and type of punctuation to be inserted by a continuous speech recognition system. These probabilities are estimated during the training of the language model and utilized during the decoding process to find the best complete path. Several example probabilities for some languages are provided hereinbelow.

English and Other European Languages

In the English language, certain probabilities exist regarding punctuation. For example, a punctuation mark never appears after THE, A, VERY, and OUR, but often occurs before THE, A, and WE. French, German, Italian, and some Asian languages such as Malaysian and Indonesian are similar to English with respect to these probabilities.

Spanish

In the Spanish language, there are two types of questions marks. One type is used before a question, and the other type is used after a question. Similarly, there are two types of exclamation points, with one type being used before a sentence and the other type being used after the sentence. The pronunciations of these various types of question and exclamation marks are rather long, as shown below.

abrir signo de interrogacion (starting question mark)

cerrar signo de interrogacion (ending question mark)

abrir signo de exclamacion (starting exclamation point)

cerrar signo de exclamacion (ending exclamation point)

However, certain probabilities exist regarding punctuation in the Spanish language which allow the existence and type of question mark to predicted fairly accurately. For example, the need for a starting question mark can be predicted by considering the first word (or two) of the sentence. This is because the starting question mark usually precedes the words cuando (when), cuanto (how much), que (what), quien (who), donde (where), and cual (which). Similarly, the need for a starting exclamation mark can be predicted by considering the first word (or two) of a sentence. This is because the starting exclamation mark usually precedes the words hola (hello), disculpeme (excuse), and auxilio (help).

Japanese

There are only two types of punctuation marks in Japanese, the comma and the period. The need for a period is easily predicted because almost all Japanese sentences end with a verb (or a verbal adjective) in declarative mode. Typical ending words in Japanese sentences include the following: masu, desu, ta, deshita, masen, nai, shiou. There is no question mark in Japanese, because all questions end with a question particle ka. Thus, there is no ambiguity when a question is ended by a period.

The need for a comma may also be predicted. For example, a comma is generally required after a noun particle, or words such as ta and ga. These probabilities allow for a high accuracy rate when automatic punctuating the Japanese language.

Chinese

There are many punctuation marks in modern written Chinese, which have been defined by scholars in the period of 1913 to 1920. While those punctuation marks are rather difficult to pronounce, many of them are predictable. For example, questions often end with the particle "ma" or "ne", and exclamation sentences often end with the particle "a" or "ba".

Korean

Korean is an agglutinative language, similar to Japanese. However, Korea adapts the Western style of punctuation. The sentences are often ended with a verb in declarative mode. The questions are almost always ended with "kka". In some sense, the question marks are redundant. Thus, automatic punctuating for the Korean language would be quite accurate.

Thai

Written Thai has no punctuation marks. White space is used for delimitating phrases. Thus, in training the language model, white space should be treated as a "word", similar to the punctuation marks in other written languages. In the acoustic vocabulary, those white spaces have a baseform corresponding to a double silence or an inhalation noise, just as in English.

EXPERIMENTAL RESULTS.

The present invention has shown positive results in numerous experiments conducted in English. For the experiments described herein, the tested speech consisted of a business letter of 333 words including 31 punctuation marks. The speech was read without pronouncing the punctuation marks. In order to enhance the reliability of the test results, multiple speakers (3) were used. The original test script (business letter), as well as decoded versions of that script according to the prior art and the present invention, are provided hereinbelow.

The experiments consisted of two test cases, with each case respectively utilizing two different methods for building (training) the language model. In the first case, only long pauses (i.e., double silences) and non-word noises were used to represent punctuation marks. In the second case, single pauses were also used to represent punctuation marks. Thus, in the first case, each of the punctuation marks were assigned a set of baseforms as follows:

| | |
|---|---|
| , | X X |
| , | X HH X |
| , | X F X |
| , | X K X |
| , | X P X |
| , | X UM X |

In the second case, in addition to the above baseforms, the single pause was also included, as shown below.

| | |
|---|---|
| , | X |

As stated above, two different methods of building the language models were implemented. In the first method, the counting process segmented the tested speech into paragraphs. The length of the paragraphs were about 200 to 500 words. The second method used to build the language model performed the counting process according to the conventional method of segmenting the tested speech into sentences.

After decoding, the decoded script is compared against the original script in order to find out which punctuation marks have been decoded correctly. The results of the various experiments are listed hereinbelow, utilizing the following designations:

Correct: The number of punctuation marks in the correct location and of the correct type.

Sub: The number of punctuation marks in the correct location but not of the correct type (usually COLON or PERIOD replaced by COMMAs.)

Del: The number of deleted punctuation marks.

Ins: The number of inserted punctuation marks.

W err: The total error rate (i.e., all errors including errors in predicting words, punctuation marks, and silences).

CASE 1—WITHOUT X (single pause) AS PUNCTUATION BASEFORM

For an implementation of case 1, where the counting process performed during the training of the language model segmented the training text into paragraphs, the results are as follows:

| SPEAKER | Ins | Del | Sub | Correct | W err |
|---|---|---|---|---|---|
| 1 | 8 | 7 | 9 | 15 | 12.95% |
| 2 | 4 | 7 | 7 | 17 | 15.66% |
| 3 | 5 | 13 | 5 | 13 | 17.77% |

For an implementation of case 1, where the counting process segmented the training text into sentences, the results are as follows:

| SPEAKER | Ins | Del | Sub | Correct | W err |
|---|---|---|---|---|---|
| 1 | 7 | 10 | 12 | 9 | 15.06% |
| 2 | 2 | 11 | 9 | 11 | 16.87% |
| 3 | 4 | 15 | 12 | 4 | 20.18% |

CASE 2—WITH X (single pause) AS PUNCTUATION BASEFORM

For an implementation of case 2, where the counting process performed during the training of the language model segmented the training text into paragraphs, the results are as follows:

| SPEAKER | Ins | Del | Sub | Correct | W err |
|---|---|---|---|---|---|
| 1 | 12 | 4 | 9 | 18 | 13.25% |
| 2 | 7 | 4 | 8 | 19 | 16.57% |
| 3 | 10 | 8 | 7 | 16 | 18.37% |

For an implementation of case 2, where the counting process segmented the training text into sentences, the results are as follows:

| SPEAKER | Ins | Del | Sub | Correct | W err |
|---|---|---|---|---|---|
| 1 | 12 | 4 | 15 | 12 | 15.36% |
| 2 | 6 | 8 | 11 | 14 | 17.77% |
| 3 | 7 | 10 | 12 | 9 | 19.58% |

The results of the above experiments show that the conventional method of building the language model by segmenting text into sentences leads to a lower punctuation accuracy rate. In the preferred embodiment of the invention, the language model is built by segmenting text into paragraphs, and baseforms are assigned to single and double pauses (case II).

Any superfluous punctuation marks are almost always COMMAs at pauses. According to style, those can be legitimate punctuation marks or not. However, it is easy to remove them at the editing stage to fit the author's style. It is to be appreciated that by eliminating a single pause as a baseform, superfluous punctuation marks are substantially reduced (case I). However, the number of correct punctuation marks is also reduced. The best mode results when a single pause is eliminated as a baseform, and the user is asked to take a longer pause for punctuation marks.

It is to be appreciated that the accuracy of predicted punctuation in a system where punctuation must be pronounced is not affected when the language model is built based on segmented paragraphs. The following table lists the word error rates for a system requiring pronounced punctuation, with the second column corresponding to using a language model built by segmenting the text corpus into sentences and the third column corresponding to using a language model built by segmenting the text corpus into paragraphs:

| speaker | text corpus segmented into sentences | text corpus segmented into paragraphs |
|---|---|---|
| 1 | 8.41% | 8.7% |
| 2 | 11.30% | 10.14% |
| 3 | 9.28% | 9.57% |
| average | 9.66% | 9.47% |

The difference is within experimental error variation. Thus, language models used in systems requiring pronounced punctuation may also be built by segmenting the text corpus into paragraphs, with no appreciable detriment in recognition accuracy.

The original test script (business letter), as well as decoded versions of that script according to the prior art and the present invention, will now be provided.

1. Original Test Script (being read as a whole piece)

Dear Barbara: We finally received in the mail on Friday the enclosed letter from Cohen's counsel setting forth the people who she considered to be the comparisons for her equal pay act claim. She also rejects our settlement proposal. Here is our plan of action. We proceed, as I mentioned to you last week, with moving to strike or dismiss as many allegations of her complaint as possible in order to limit the issues, and answer the remaining allegations. Michael is in the process of drafting this pleading. Although by the time you receive this letter, I hopefully will be starting my vacation on a Greek island, thanks to today's technology, I will be able to work with him on it. He will coordinate with you the sending a copy of the amended complaint and the draft of the motion to answer in time for your review and input. In the meantime, please let Michael know if he should be getting the information from Frank Wilson about the people's salaries Cohen has identified. Otherwise, we will assume that you can obtain that information more directly. Let's wee what that information tells us. as you recall, you initially concluded that Cohen's attorney was not even using the right salary for her. I am not sure how much difference that makes. In any event, based on that information as well as the theory, we should discuss if you have any interest in increasing the settlement offer. By the way, I am scheduled to be coming into New York City on September 16th to meet with a client. I will be likely to be there again in late September for depositions. If it works with your schedule, perhaps we should plan on getting together during one of these two trips. Very truly yours, Linda Miller 2. Decoded Text (note that numerous pauses (designated by the term "SILENCE") are still decoded as pauses, NOT punctuation marks)

Dear Barbara . we finally received in the mail on Friday the enclosed letter SILENCE from Colon's counsel setting forth the SILENCE people who she can SILENCE consider to be the SILENCE comparisons for her equal pay SILENCE act claim . see also rejects our settlement proposal . here is that plan of action . we proceeded SILENCE as I mentioned to you last week, without moving to strike or dismiss SILENCE as many allegations of SILENCE a complaint as possible. in order to limit the issues, any answer the remaining allegations Michael is in the process of drafting this pleading although by the time you receive this letter . I hopefully will be starting my vacation on a SILENCE Greek Islands , that as to delays technology , I will be able to work with him on its SILENCE fee will coordinate with you the sending SILENCE a copy of the SILENCE amended complaint and the draft of the motion SILENCE to be answered in time for your review and , in part SILENCE in the meantime , please let Michael know if he should be getting the information SILENCE from Frank Wilson about the people salaries , Cohen has identified . otherwise , we will assume that you can obtain that information would directly . let's see what that informations tells us , as the record , you initially concluded that Colon's attorney , was not even using the write salary for . I am not sure how much difference that makes SILENCE in any event , based on that information as well as the theory . we should discuss , if you have any interest in increasing the settlement offer by the way , I am scheduled to be coming into New York City . on September 16th to meet with the client , I will SILENCE be likely to be in there again in late September for SILENCE depositions , if it works with your schedule . please . do we should plan on getting together during one of these two SILENCE trips . very truly yours , Linda SILENCE 3. Result With Original Language Model (note that many periods are substituted by commas)

Dear Barbara, we finally received in the mail on Friday the enclosed letter from Colon's counsel setting forth the people who she can consider to be the comparisons for high equal pay act claim, see also reject our settlement proposal, here is a plan of action, we proceeded as I mentioned to you last week, without moving to strike or dismiss as many allegations of a complaint as possible in order to limit the issues, any answer the remaining allegations, Michael is in the process of drafting this pleading, although by the time you receive this letter, I hopefully will be starting my vacation on a Greek Islands, that as to delays technology, I will be able to work with him on its fee will coordinate with you the sending a copy of the amended complaint and the draft of the motion to be answered in time for your review and, in part in the meantime, please let Michael know if he should be getting the affirmation from Frank Wilson about the people salaries, Cohen has identified a otherwise, we will assume that you can obtain that information more directly, let's see what that informations tells us, as the record, you initially concluded that Colon's attorney, was not even using the write salary for I am not sure how much difference that makes in any event, based on that information as well as the theory, we should discuss, if you have any interest in increasing the settlement offer, by way, I'm scheduled to be coming into New York City, on September 16th to meet with the client, I will be likely to be in there again in late September for depositions, if the words with your schedule, please? two recent plan on getting together during one of these two trips very truly yours, Linda 4. Result with Improved Language Model of the Invention Dear Barbara. We finally received in the mail on Friday the enclosed letter from Colon's counsel setting forth the people who she can consider to be the comparisons for her equal pay act claim. See also rejects our settlement proposal. Here is that plan of action. We proceeded as I mentioned to you last week, without moving to strike or dismiss as many allegations of a complaint as possible. In order to limit the issues, any answer the remaining allegations, Michael is in the process of drafting this pleading. Although by the time you receive this letter. I hopefully will be starting my vacation on a Greek Islands, that as to delays technology, I will be able to work with him on its fee will coordinate with you the sending a copy of the amended complaint and the draft of the motion to be answered in time for your review and, in part in the meantime, please let Michael know if he should be getting the information from Frank Wilson about the people salaries, Cohen has identified. Otherwise, we will assume that you can obtain that information would directly. Let's see what that informations tells us, as the record, you initially concluded that Colon's attorney, was not even using the write salary for. I am not sure how much difference that makes in any event, based on that information as well as the theory. We should discuss, if you have any interest in increasing the settlement offer. By the way, I am scheduled to be coming into New York City. On September 16th to meet with the client, I will be likely to be in there again in late September for depositions, if it works with your schedule. Please. Do we should plan on getting together during one of these two trips. Very truly yours, Linda Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. In a speech recognition system that outputs a sequence of decoded words, a method for automatically punctuating the sequence of decoded words comprises the steps of:

in a vocabulary that defines items in a language model, the items including words and punctuation marks, assigning at least one baseform to each of the punctuation marks, the at least one baseform corresponding to at least one of silence and a non-word noise;

in the language model, defining conditional probabilities for each of the punctuation marks based upon at least one of at least one preceding word and at least one succeeding word; and automatically inserting a subject punctuation mark at a given point in the sequence of decoded words when an acoustic score and a language model score associated with the subject punctuation mark produce a higher combined likelihood than the acoustic score and the language model score associated with any other item in the vocabulary for the given point in the sequence of decoded words.

2. The method of claim 1, wherein the baseform corresponding to the silence is represented by at least one silence phone.

3. The method of claim 1, wherein the baseform corresponding to the non-word noise is represented by one of at least one consonant phone preceded and followed by the silence phone, at least one vowel phone preceded and followed by the silence phone, and at least one consonant phone and at least one vowel phone preceded and followed by the silence phone.

4. The method of claim 1, wherein the language model is an n-gram language model, and said method further comprises the step of:

in a training phase of the n-gram language model, segmenting a corresponding text corpus into paragraphs to obtain word frequency counts that include each of the punctuation marks in a position other than a last position.

5. The method of claim 4, wherein each paragraph includes about 200 to 500 words.

6. The method of claim 4, wherein the n-gram language model is one of a bigram language model and a trigram language model.

7. The method of claim 1, wherein the language model is an n-gram language model, and said method further comprises the step of:

in a training phase of the n-gram language model, segmenting a corresponding text corpus into paragraphs to obtain the conditional probabilities for the punctuation marks.

8. The method of claim 7, wherein each paragraph includes about 200 to 500 words.

9. The method of claim 7, wherein the n-gram language model is one of a bigram language model and a trigram language model.

10. The method of claim 1, wherein at least one punctuation mark is also assigned at least one baseform corresponding to a pronunciation of a word representing the punctuation mark.

11. In a speech recognition system which recognizes a spoken utterance and, in response, outputs a sequence of decoded words, a method for automatically punctuating the sequence of decoded words comprises the steps of:

assigning at least one baseform to a subject punctuation mark in a vocabulary of words and punctuation marks, the at least one baseform including at least one of a silence phone, two consecutive silence phones, at least one consonant phone preceded and followed by the silence phone, at least one vowel phone preceded and followed by the silence phone, and at least one consonant phone and at least one vowel phone preceded and followed by the silence phone, the vocabulary defining items for which language model scores exist;

defining at least one conditional probability for the subject punctuation mark in a language model based upon at least one of at least one preceding word and at least one succeeding word; and generating a word match score corresponding to the probability that the subject punctuation mark corresponds to acoustic data generated by said utterance;

generating a language model score corresponding to the probability that the subject punctuation mark corresponds to the acoustic data generated by said utterance; and automatically inserting the subject punctuation mark at a given position in the sequence of decoded words when the combination of the word match score and the language model score produces the highest combined likelihood over any other word and punctuation mark in the vocabulary for the given position.

12. The method of claim 11, wherein each word, silence and punctuation mark in the vocabulary is represented by at least one baseform.

13. The method of claim 11, wherein the language model is an n-gram language model, and said method further comprises the step of:

in a training phase of the n-gram language model, segmenting a corresponding text corpus into paragraphs to obtain word frequency counts that include the subject punctuation mark in a position other than a last position.

14. The method of claim 13, wherein each paragraph includes about 200 to 500 words.

15. The method of claim 13, wherein the n-gram language model is one of a bigram language model and a trigram language model.

16. The method of claim 11, wherein the language model is an n-gram language model, and said method further comprises the step of:

in a training phase of the n-gram language model, segmenting a corresponding text corpus into paragraphs to obtain the at least one conditional probability for the subject punctuation mark.

17. The method of claim 16, wherein each paragraph includes about 200 to 500 words.

18. The method of claim 16, wherein the n-gram language model is one of a bigram language model and a trigram language model.

19. In a speech recognition system which recognizes a spoken utterance consisting of an input sequence of spoken words and outputs a sequence of decoded words, a method for automatically punctuating the decoded words comprises the steps of:

training an acoustic model;

training an n-gram language model;

building a vocabulary of items, the items including words and punctuation marks, said building step including assigning at least one baseform to each of the punctuation marks in the vocabulary, the at least one baseform corresponding to at least one of silence and a non-word noise, the vocabulary defining the items for which language model scores exist;

defining conditional probabilities for the punctuation marks in the language model based upon at least one of at least one preceding word and at least one succeeding word; and generating a word match score corresponding to the probability that a subject punctuation mark in the vocabulary corresponds to acoustic data generated by said utterance;

generating a language model score corresponding to the probability that the subject punctuation mark corresponds to acoustic data generated by said utterance; and automatically inserting the subject punctuation mark at a given point in the sequence of decoded words when the combination of the word match score and the language model score produces the highest combined likelihood over any other item in the vocabulary for the given point.

20. The method of claim 19, wherein the baseform corresponding to the silence is represented by at least one silence phone.

21. The method of claim 19, wherein the baseform corresponding to the silence is represented by two consecutive silence phones.

22. The method of claim 19, wherein the baseform corresponding to the non-word noise is represented by one of at least one consonant phone preceded and followed by the silence phone, at least one vowel phone preceded and followed by the silence phone, and at least one consonant phone and at least one vowel phone preceded and followed by the silence phone.

23. The method of claim 19, wherein the step of training the n-gram language model further comprises the step of segmenting a training text corpus into a plurality of paragraphs to obtain word frequency counts that include the subject punctuation mark in a position other than a last position.

24. The method of claim 23, wherein each paragraph includes about 200 to 500 words.

25. The method of claim 23, wherein the n-gram language model is one of a bigram language model and a trigram language model.

26. The method of claim 19, wherein the step of training the n-gram language model further comprises the step of segmenting a corresponding text corpus into paragraphs to obtain the conditional probabilities for the punctuation marks.

27. The method of claim 26, wherein each paragraph includes about 200 to 500 words.

28. The method of claim 26, wherein the n-gram language model is one of a bigram language model and a trigram language model.

29. The method of claim 19, wherein at least one punctuation mark is also assigned at least one baseform corresponding to a pronunciation of a word representing the punctuation mark.

* * * * *